United States Patent [19]

Dankel

[11] 4,402,366
[45] Sep. 6, 1983

[54] SOIL TILLING MACHINE

[75] Inventor: Douglas D. Dankel, Kankakee, Ill.

[73] Assignee: Roper Corporation, Kankakee, Ill.

[21] Appl. No.: 178,470

[22] Filed: Aug. 15, 1980

[51] Int. Cl.³ .................. B62D 51/04; A01B 33/02
[52] U.S. Cl. .................................... 172/43; 172/52
[58] Field of Search .............. 172/42, 43, 48, 52, 172/60, 69, 114, 125, 520, 49; 37/40, 43 E

[56] References Cited

U.S. PATENT DOCUMENTS

| 980,484 | 1/1911 | Bradley | 172/52 |
|---|---|---|---|
| 1,333,543 | 3/1920 | Greene | 172/52 |
| 2,063,769 | 12/1936 | Suelflow | 172/52 |
| 2,400,562 | 5/1946 | Marihart | 172/52 X |
| 2,424,459 | 7/1947 | Hettelsater | 172/49 X |
| 2,612,094 | 9/1952 | Drozinski | 172/48 |
| 2,614,375 | 10/1952 | Calkins | 172/520 |
| 2,617,341 | 11/1952 | Clayton | 172/43 |
| 2,765,157 | 10/1956 | Hanson | 172/42 X |
| 2,777,374 | 1/1957 | Kinsey | 172/42 |
| 3,760,884 | 9/1973 | Webster | 172/60 |
| 3,773,112 | 11/1973 | Zinck | 172/42 |
| 3,941,193 | 3/1976 | Shoemaker | 172/52 X |
| 4,123,857 | 11/1978 | Enters et al. | 37/43 E |

FOREIGN PATENT DOCUMENTS

| 678184 | 3/1966 | Belgium . | |
|---|---|---|---|
| 1048060 | 12/1958 | Fed. Rep. of Germany . | |
| 1782434 | 2/1974 | Fed. Rep. of Germany | 172/42 |
| 2349105 | 4/1975 | Fed. Rep. of Germany | 172/52 |
| 2618842 | 11/1977 | Fed. Rep. of Germany | 172/42 |
| 1059637 | 10/1953 | France . | |
| 583381 | 10/1958 | Italy | 172/52 |

Primary Examiner—Richard T. Stouffer
Attorney, Agent, or Firm—C. Frederick Leydig; Dennis R. Schlemmer; David J. Richter

[57] ABSTRACT

A walk from behind soil tilling machine including ground wheels upon which the machine may be moved and two rows of ground penetrating and pulverizing tines located to the rear of the ground wheels transversely to the line of machine movement. The tines of the rear row have a larger cutting diameter than the tines of the forward row, and the rows of tines are driven in counter-rotating directions such that upon forward movement of the machine the tines of the forward row break the surface of the ground and penetrate the earth to a determined relatively shallow depth and the tines of the rear row thereupon penetrate the earth to a further determined depth, with the forward and rear rows of tines cooperating to completely pulverize both depths of penetrated soil, thereby permitting thorough tilling of the soil to normal garden depth with a single passage of the machine. Both rows of tines in the illustrated machine are carried by a transmission housing which can be pivotably positioned relative to the machine frame for selectively adjusting the respective depths of penetration of the tines of the forward and rear rows.

19 Claims, 10 Drawing Figures

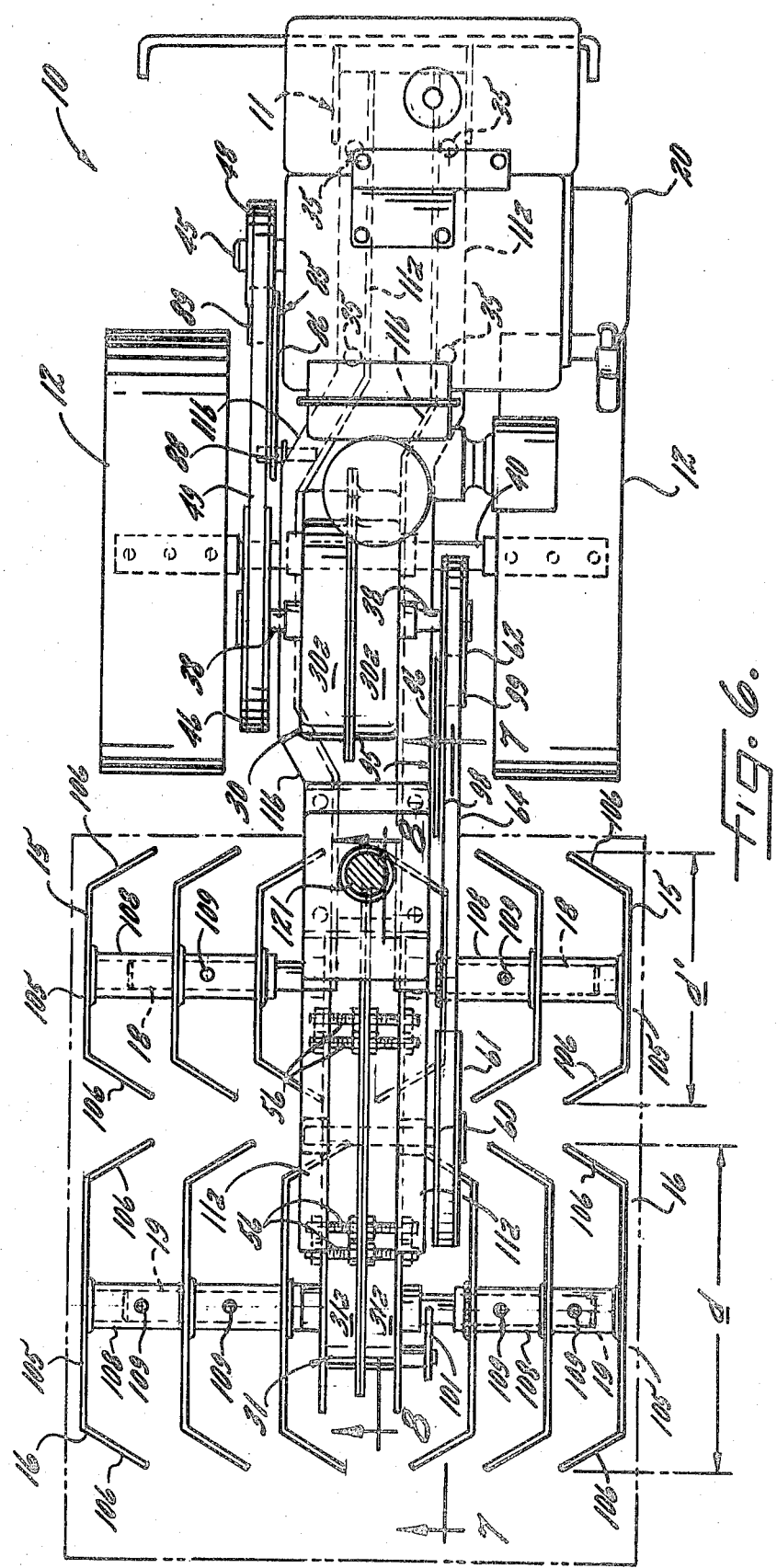

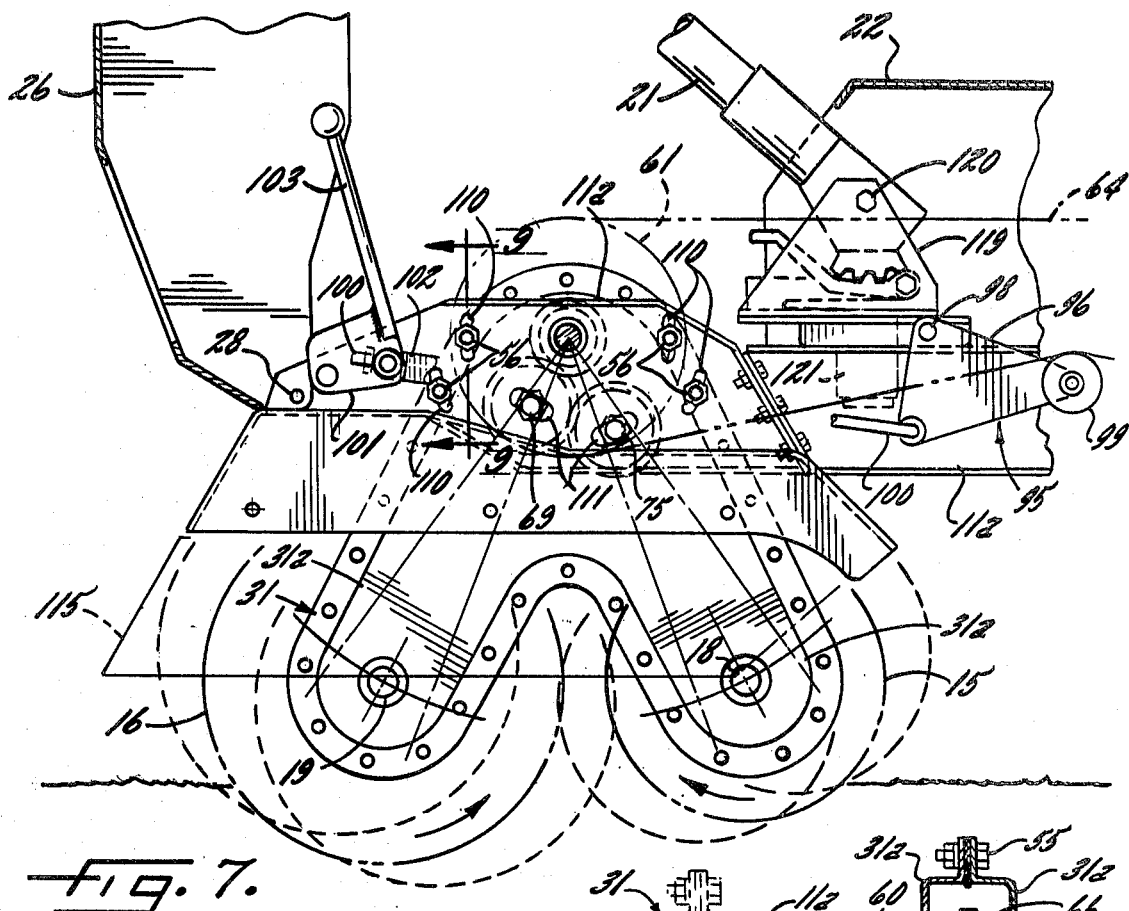
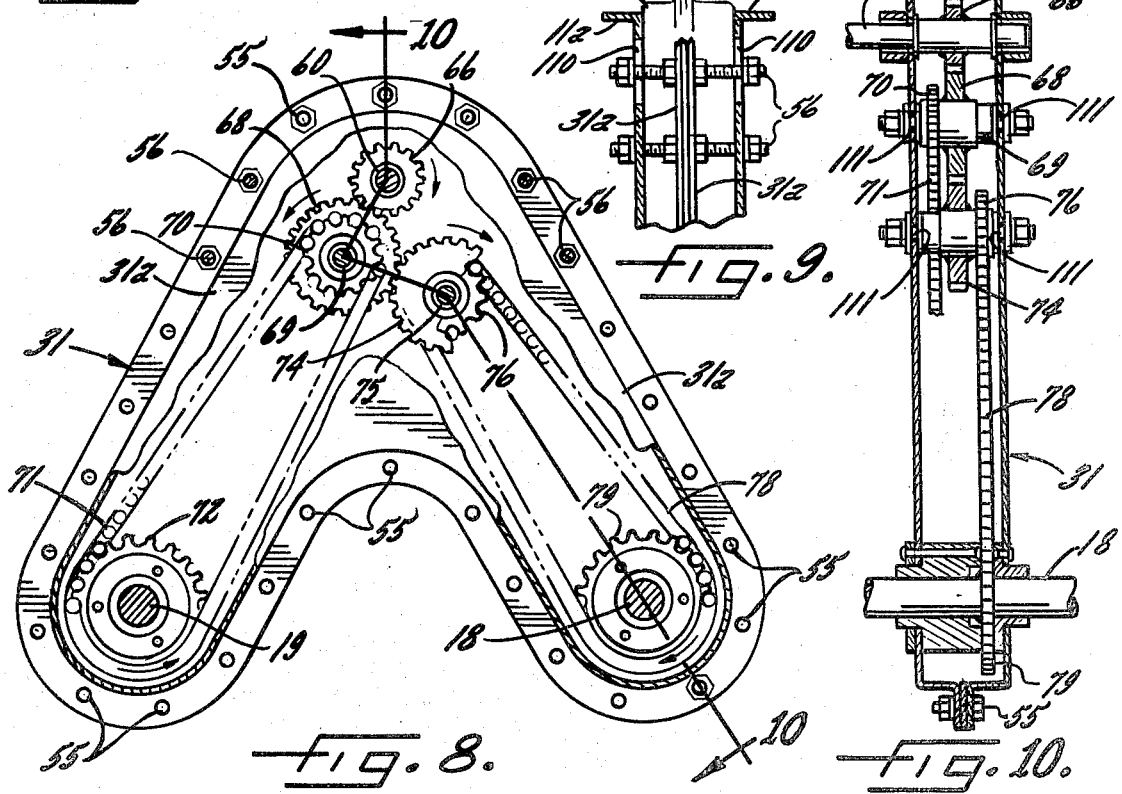

SOIL TILLING MACHINE

DESCRIPTION OF THE INVENTION

The present invention relates to power operated soil tilling machines, and more particularly, to soil tilling machines of the type which are manually manipulated and controlled by a person walking with or behind the machine.

Manually operated soil tilling machines of such type, which typically comprise a plurality of power driven tines for penetrating and pulverizing a layer of the earth over which the machine passes, commonly are of a size adapted for home garden or small area usage which does not permit or justify the expense of conventional farm type cultivating equipment. Because the size of such tilling machines must necessarily be limited to the extent that permits manual manipulation, such walk-behind tilling machines often are incapable of tilling the soil to the degree or depth desired in a single pass. As a result, in use of such walk-behind type tilling machines, it is frequently necessary to successively work each pass of the machine a number of times in order to achieve adequate tilling, usually with the tiller being controlled such that during each pass the machine penetrates a further relatively thin layer of earth and further breaks down the clumps of the previously worked track. When attempts are made to operate conventional tilling machines to deeper depths or to drive the tines with greater power, such machines become increasingly difficult to control with the tines frequently tending to pull the machine forward instead of tilling the soil (referred to as walking), or create such thrust forces that the machine is difficult to maintain in a straight track. The foregoing problems are compounded when the tilling machine is used in wet clay or other soil conditions that are difficult to penetrate or break down.

It is an object of the present invention to provide a manually operated, walk-behind, type soil tilling machine which is capable of improved soil penetration and pulverization.

Another object is to provide a tilling machine as characterized above which will thoroughly till soil to normal garden depths in a single pass of the machine so as to avoid the necessity for successive or multiple tilling operations.

A further object is to provide a tilling machine of the above kind which can be controlled and manipulated with relative ease by an operator walking with the machine. A related object is to provide such a tilling machine which can be operated on most soil conditions at normal garden tilling depths without the machine tending to "walk" away from the operator or veer from a straight track.

Yet another object is to provide a tilling machine of the foregoing type which is adapted to leave the tilled soil in a smooth thoroughly pulverized condition without undesirable trenching.

Other objects and advantages of the invention will become apparent upon reading the following detailed description and upon reference to the drawings, in which:

FIG. 1 is a perspective of an illustrative soil tilling machine embodying the present invention;

FIGS. 2, 3, and 4, are partially diagrammatic representations of the tilling machine shown in FIG. 1 with front and rear rows of soil penetration tines selectively located at different operating elevations;

FIG. 6 is a top view of the illustrated machine, with the engine and tine covers removed;

Figure 1:
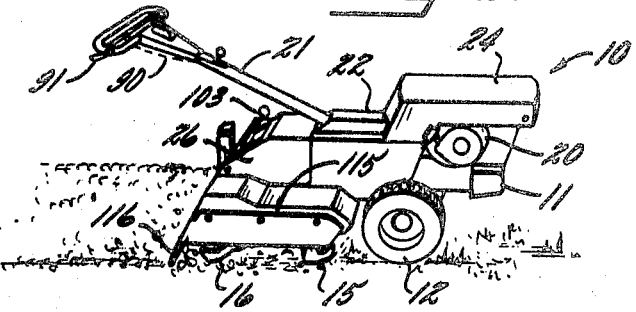

FIGS. 7 and 8 are vertical sections taken in the planes of line 7—7 and 8—8, respectively, in FIG. 6;

FIG. 9 is an enlarged fragmentary section taken in the plane of line 9—9 in FIG. 7; and FIG. 10 is a section taken in the plane of line 10—10 in FIG. 8.

While the invention is susceptible of various modifications and alternative constructions, a certain illustrated embodiment thereof has been shown in the drawings and will be described below in detail. It should be understood, however, that there is no intention to limit the invention to the specific form disclosed, but on the contrary, the invention is to cover all modifications, alternative constructions and equivalents falling within the spirit and scope of the invention.

Referring now more particularly to the drawings, there is shown an illustrative soil tilling machine 10 embodying the present invention. The illustrated tilling machine 10 includes an elongated frame 11 supported for rolling movement by a pair of ground wheels 12, rows of ground penetrating and pulverizing tines 15, 16 mounted on respective parallel front and rear tine axles 18, 19 located rearwardly of the ground wheels 12 and transversely to the line of machine movement, an internal combustion engine 20 mounted on a forwardmost end of the frame 11 for rotatably driving the ground wheels 12 and tines 15, 16, and a handle 21 extending rearwardly of the frame 11 for enabling a user to operate the machine while walking from behind or either side. The machine 10 in this instance includes a hood 24 and a cover 22, the hood being pivotably mounted at 25 to permit access to the engine, and a rear cover 26 pivotably mounted at 28 to permit access to the drive for the tines.

The machine frame 11 comprises a pair of transversely spaced, generally horizontally disposed supports 11a between which are mounted a ground wheel transmission 30 and a tine transmission 31 which serve to support the respective ground wheels 12 and tines 15, 16 in depending fashion below the frame 11 and transmit power thereto from the engine 20. The engine 20, which typically may be a four-cycle gasoline powered internal combustion of between about five and eight horsepower, is secured to the forwardmost end of the frame supports 11a by bolts 35. The ground wheel transmission 30 includes a two-part sealed housing 30a secured together by bolts 36, and in this instance, the transmission 30 is mounted between a transversely offset section 11b of the frame 11. The transmission 30 has an input shaft 38 rotatably carried in an upward portion of the housing 30a above the frame 11 and a ground wheel axle 40 carried in a lower portion of the transmission housing below the frame. The offset frame support section 11b supports the ground wheel transmission 30 such that an extension of the transmission input shaft 38 is adjacent an output shaft 45 of the engine 20 and is coupled thereto through respective sheaves 46, 48 and a drive belt 49, as shown in FIG. 6. It will be understood that the transmission 30 may be of a known type which permits selective driving of the ground wheels at one or more forward speeds, or in a reverse direction, when the transmission input shaft 38 is driven by the engine.

Thus, the engine 20 is adapted to power the ground wheels 12 through the transmission 30 to move the machine 10 along a track that is to be tilled by the rows of tines 15, 16 located immediately behind the ground wheels.

In accordance with the invention, the tines of the rear row have a deeper cutting capability than the tines of the forward row and the two rows are driven in counter-rotative directions such that upon forward movement of the machine the forward row of tines break the surface of the ground and penetrate the earth to a determined relatively shallow depth and the rear row of tines thereupon penetrate the ground to a further determined depth, with the forward and rear rows of tines cooperating to completely pulverize both layers of penetrated earth, thereby permitting thorough tilling of the soil to a normal garden depth with a single passage of the machine. The tine transmission 31, like the ground wheel transmission 30, comprises a two-part sealed housing 31a secured together by bolts 55, but in this instance, has a generally inverted V-shaped configuration with the forward and rearward tine axles 18, 19 rotatably disposed in depending legs of the V housing 31a. An upper portion of the transmission housing is mounted between the frame supports 11a by bolts 56.

For driving the tine transmission 31, the housing 31a carries a rotatable input shaft 60 which has an end extending outwardly of the housing 31a carrying a sheave 61 that is operatively connected to the input shaft 38 of the ground wheel transmission 30 by a sheave 62 and belt 64. The input shaft 60 of the transmission 31 carries a pinion 66, disposed within the transmission housing 31a, which drives a pinion 68 of a shaft 69 rotatably carried by the housing. The shaft 69 also carries a sprocket 70 which drives the rear tine axle 19 through a chain 71 and sprocket 72 mounted on the axle 19. The pinion 68 further drives a pinion 74 carried by a shaft 75 also rotatably supported by the transmission housing. The shaft 75 in turn carries a sprocket 76 which drives the forward tine axle 18 through a chain 78 and sprocket 79 mounted on the axle 18. It can be seen, therefore, that the engine 20 will rotatably drive both the ground wheels 12 and the front and rear tine axles 18, 19 through the respective transmissions 30, 31. Moreover, by virtue of the arrangement of the illustrated transmission 31, it will be seen that the front and rear tine axles 18, 19, and thus the tines mounted thereon, are rotated in opposite directions. In the illustrated embodiment, the forward axle mounted tines 15 are rotated such that their undersides move in a rearward direction while the rear axle mounted tines 16 are rotated with their undersides moving in a forward direction.

Figure 2:
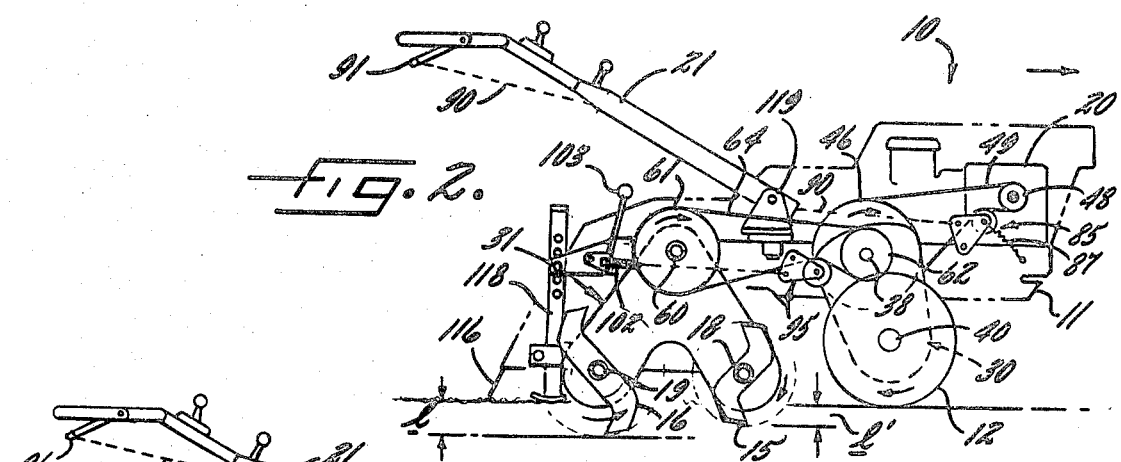

To permit selective engagement and disengagement of the tine and the ground wheel transmissions 30, 31 with the engine 20, a clutch 85 is provided. The clutch 85 includes a bell crank 86 that is pivotably mounted on the machine frame at 88 and carries an idler pulley 89 at one end thereof for engagement with the belt 49 connecting the engine drive shaft 45 and the input shaft 38 for the ground wheel transmission 30. The bell crank 86 is biased toward a clutch disengaging position in which the idler pulley 89 is disengaged from the belt 49 by a spring 87 extending between the pinion carrying end of the bell crank 86 and the machine frame, as shown in FIG. 2. A clutch cable 90 extends from another end of the bell crank 86 to a clutch lever 91 pivotally connected to the underside of the handle 21 for easy access by the operator. By moving the clutch lever 91 in a direction toward the underside of the handle 21, the clutch cable will pivot the bell crank against the biasing force of the spring 87 in a counterclockwise direction, as viewed in FIG. 5, causing the idler pulley 89 to be moved to a position tightening the drive belt 49 sufficiently to drive the ground wheel transmission input shaft 38, and thus the tine transmission input shaft 60 connected thereto through the belt 64. Upon release of the clutch lever 91, whether intentionally or in the event that an operator should stumble or otherwise loose control of the machine, the bell crank 86 will be pivoted, under the biasing force of the spring 87, to a position disengaging the idler pulley 89 from the drive pulley 49.

In order to permit selective disengagement of the tine transmission 31, while the ground wheel transmission 30 continues to be driven by the engine 20, a separate tine transmission clutch 95 is provided. The tine transmission clutch 95 includes a bell crank 96 that is pivotably mounted on the machine frame at 98 and carries in idler pulley 99 for engagement with the belt 64 coupled between the input shafts 38 and 60 for the ground wheel and tine transmissions 30, 31, respectively. For selectively pivoting the bell crank 96, a clutch rod 100 is connected between the bell crank 96 and an over center pivot plate 101 through a spring loaded connection 102. By pivotal movement of a tine transmission clutch lever 103 in a clockwise direction, as viewed in FIG. 5, the pivot plate 101 may be moved over a center position, causing counterclockwise pivoting of the bell crank 96 moving the idler pulley 99 into a belt tensioning and clutch engaging position. For disengaging the clutch, the lever 103 is moved in a counterclockwise direction, as viewed in FIG. 5, which moves the pivot plate 101 over its center position and pivots the bell crank 96 in a clockwise direction, relieving the tension on the drive belt 64 and interrupting the drive to the tine transmission input shaft 60. It should also be recognized that release of the clutch lever 91 will interrupt the drive to the tine transmission due to the fact that the clutch lever 91 controls the clutch 85.

Figure 5:
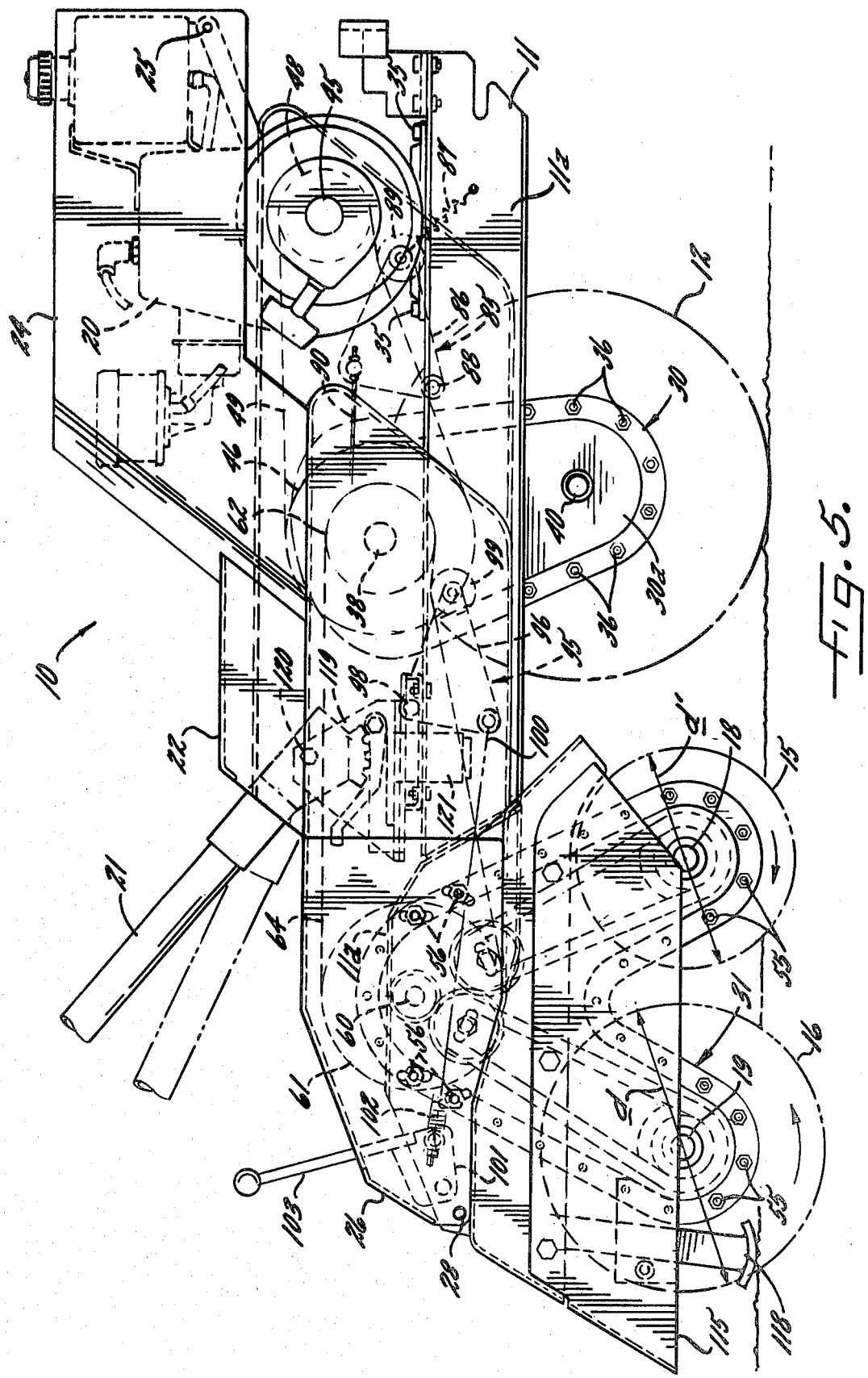
FIG. 5 is a side elevational view of the illustrated tilling machine.

In carrying out the invention, the tines 16 of the rear row have a larger cutting diameter than the tines of the forward row such that when the tine axles 18, 19 are in the same horizontal plane, as illustrated in FIGS. 5 and 7, the rear tines penetrate the earth to a greater depth than the forward tines. As best viewed in FIGS. 2 and 6, the illustrated tines 15, 16 are of the two-tang or cutting blade type, each including a body portion 105 disposed in a vertical plane, with opposite ends formed with a dog-leg to define a cutting blade 106 disposed at an angle to the body portion 105. In the illustrated embodiment, three tines are mounted on a respective tine axle on each side of the tine transmission 31. Each set of three tines is mounted on a mutual hub 108, which in turn is fitted over the respective tine axle and secured to the axle by pins 109. The tines of each set preferably are mounted with the cutting blades directed inwardly, as illustrated in FIG. 6, and with the blades 106 of adjacent tines 60° out of phase with each other so that they will sequentially engage the ground. To balance reaction forces on each tine axle, it is preferred that the two outside tines on each axle be aligned so as to simultaneously contact the soil. The two intermediate tines should also be so aligned, as should the two innermost tines.

The forward and rearward rows of tines 15, 16 also preferably should be spaced apart from each other such that there is no intermeshing between the cutting blades of the front and rear rows of tines. Such spacing of the rows of tines further facilitates pulverization of the soil during tilling, as will become apparent.

It will be seen that when the tine axles 18, 19 are rotatably driven upon engagement of the clutches 85, 95, the rear axle mounted tines 16 define a cutting diameter d which is larger than the cutting diameter d' for the forward axle mounted tines. The respective diameters of the forward and rearward tines 15, 16 should be such that during normal operation of the tilling machine 10 (i.e., when the machine frame is maintained essentially parallel to the ground) the forward tines will penetrate the soil to a depth 1' of between 0.2 and 0.8 of the depth of penetration 1 of the rear tines, and preferably, to a depth of about $\frac{1}{2}$ the depth of the rear tines. In practice, it has been found that the tilling machine according to the invention will effectively till to normal garden depths with such proportionate penetrations of the forward and rear tines when the forward tines have a cutting diameter of about 9" and the rear axle mounted tines have a cutting diameter of about 12" and the distance between the centerlines of the forward tine axle and the rear tine axle is about 12". Thus the separation between the cutting periphery of the forward tines and the rear tines is about $1\frac{1}{2}$", that is, 0.125 of the distance between the centerlines of the axles. Such separation is preferably in the range of 0.02 to 0.50 of the distance between the centerlines of the axles. During operation of such machine, it has been found that the forward tines will shear and penetrate the earth to a depth of about $1\frac{1}{2}$ inches while the rear tines penetrate the soil to a depth of about 3 inches. Moreover, because of the counter rotating movement of the forward and rear rows, the sheared layers of earth in each case are directed into the opposing row of rotating tines where it was further broken down and thoroughly pulverized.

Figure 3:
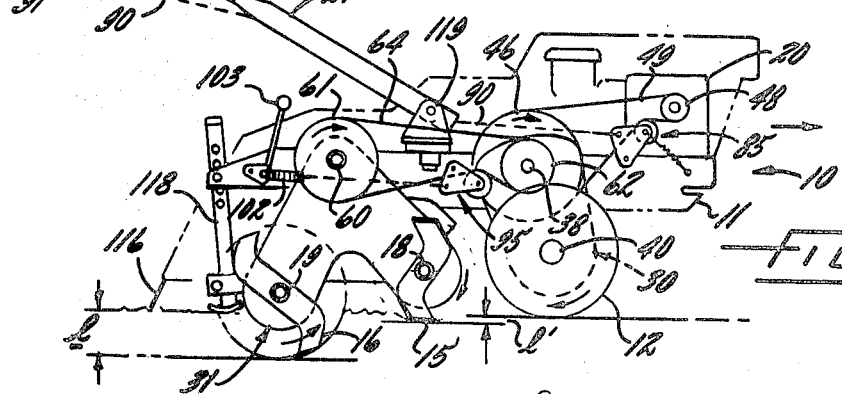
Figure 4:
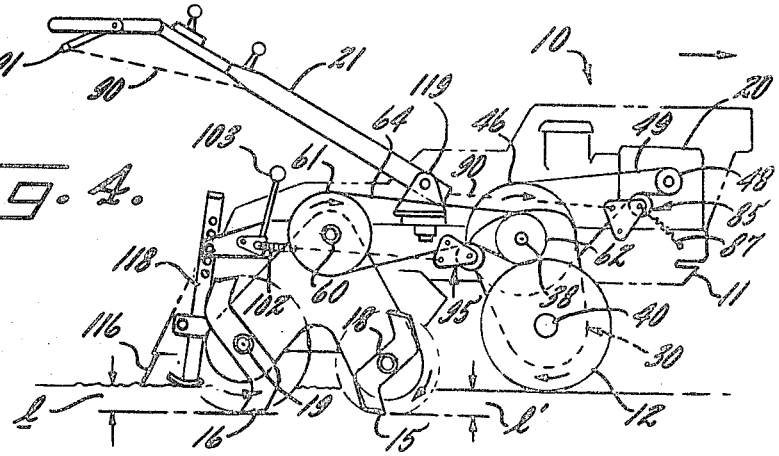

In further carrying out the invention, means are provided for selectively adjusting the vertical relationship of the front and rear tine axles 18, 19, and thus, the relative depth of soil penetration of the front and rear rows of tines 15, 16. To this end, the tine transmission 31 is mounted for selected pivotal adjustment about its input shaft 60, and the transmission mounting bolts 56 are disposed in angular slots 110 formed in the frame supports 11a such that loosening of the bolts 56 will permit pivoting of the transmission housing 31a as necessary for establishing the desired vertical positions of the tine axles 18, 19. To permit such vertical adjustment, the frame supports 11a in this case also are formed with slots 111 within which ends of the transmission shafts 69, 75 are free to move. Thus, it will be appreciated that regardless of the relative sizes of the front and rear tines 15, 16, through pivotal adjustment of the tine transmission housing 31a, the relative depths of penetration of the front and rear tines may be adjusted as desired to achieve a determined greater penetration of the rear tines 16. In the illustrated embodiment, pivotal adjustment of the transmission housing 31a is effective to permit adjustment of the rows of tines from the position illustrated in FIG. 2 in which the tine axles 18, 19 are in the same horizontal plane and the front and rear tines have respective depths of penetration 1', 1 of 1.50" and 3", to a pivoted position illustrated in FIG. 3 in which the front tine axle 18 is above the rear tine axle 19 and the front and rear tines have respective depths of penetration 1', 1 of 1.03" and 3.375", and to a pivoted position illustrated in FIG. 4 in which the front tine axle 18 is lower than the rear tine axle 19 and the front and rear tines have respective depths of penetration 1', 1 of 1.875" and 2.56".

In further keeping with the invention, the rear tines 16 may be driven at a higher peripheral speed than the front tines. In the illustrated embodiment, the front and rear tine axles 18, 19 are driven at the same rotative speed from the transmission input shaft 60, thus resulting in the rear tines 16 having a higher peripheral speed because of their larger cutting diameter. It will be appreciated that by appropriate design of the tine transmission 31 the rear tines may be driven with such higher peripheral speeds regardless of the relative diameters of the front and rear tines.

As will be understood by one skilled in the art, the power consumed by the front and rear rows of tines 15, 16 during operation of the machine 10 will vary depending upon the respective cutting diameters d, d' of the tines 15, 16, their respective depths of penetration 1, 1', their respective rotative speeds, and the soil hardness. In practice it has been found that the top surface of soil is generally harder, and thus more difficult to penetrate, than the layer immediately below the top surface. Thus, while the front tines 15 in the illustrated embodiment preferably have a lesser radius than the rear tines, when driven at the same rotational speeds, the power directed to the front tines can, and preferably should, approximate that consumed by the rear tines, notwithstanding larger torque arm of the rear tines. It has been found that the tilling machine of the present invention is effective to thoroughly pulverize soil with relatively minimum vibration, or thrust forces which must be resisted by the operator. It is believed that this results, at least in part, from the substantially uniform consumption of power by the front and rear rows of tines, with the thrust forces of the counter-rotating tines effectively cancelling each other out and enabling forward movement of the machine to be effected by the ground wheels 12, thus enabling relatively easy control of the machine. Power consumption also is believed to be more efficiently utilized since power to the tines is used essentially for soil penetration and pulverization and power to the ground wheels is used essentially for moving the machine, without the necessity for overcoming undesirable thrust forces created by the tines. The machine 10, therefore, has been found to enable thorough tilling without excessive vibration, and without the tendency of the machine to walk away from the operator or veer from a straight track during tilling. Moreover, the location of the engine 20 at the forwardmost end of the frame 11 has the effect of counter-balancing the weight of the tines, and thereby further enhances the easy maneuverability of the machine. It will be understood, however, that additional counterweights could be employed if necessary.

To further facilitate thorough pulverization of the soil during tilling, side panels 115 are provided on opposite sides of the tines. The side panels 115, which preferably are vertically adjustable, confine the soil that is tilled to the area about the rotating tines so that it is thoroughly broken down and pulverized. Such side panels further prevent the soil from being thrown transversally of the tines, with the resultant undesirable trenching that occurs from such side direction of the earth. For smoothing out the soil after it is tilled, a serrated rear panel 116 is mounted on the rear of the machine and has a lower edge which drags along the top of the tilled soil.

To permit selective adjustment in the depth to which the soil is tilled, a depth control guide 118 is secured to the rear of the machine frame and the tine transmission for selective vertical adjustment. The guide has a glide plate at its lower end which normally rests on the top of the tilled soil such that the rear of the tiller is supported at a predetermined height to control the depth of penetration of the tines.

For enabling an operator to walk behind the machine on either side of the track being tilled, the handle 21 preferably is secured to the frame by a dual axis pivot member 119 of a known type which permits vertical pivotal movement of the handle about a horizontal pivot 120, as well as transverse pivotal movement of the handle about a vertical pivot 121.

From the foregoing, it will be appreciated that the tilling machine of the present invention is adapted to thoroughly till soil to normal garden depths in a single pass of the machine, thereby avoiding the necessity for successive retracking over a tilled path. The machine also operates without excessive vibrations or thrust forces, and thus is more easily controlled and manipulated by an operator walking with the machine and can be directed along straight tracks without the machine tending to walk away from the operator or veering from a straight track.

I claim:

1. A machine for tilling soil along a path of movement of the machine comprising a frame, a plurality of tines defining a forward row of soil tilling tines, a plurality of tines defining a rear row of soil tilling tines located behind said forward row, said tines each being formed with a blade portion disposed transversely to the line of movement of the machine adapted to penetrate untilled soil and pulverize soil during tilling, means on said frame supporting said forward and rear rows of tines for rotation about respective parallel axes disposed transversely to the line of movement of said machine with the cutting periphery of the forward rows of tines being in relatively close longitudinal spaced relation to the cutting periphery of the rear row of tines, drive means carried by said frame for rotating said forward row of tines in an opposite direction than the tines of said rear row with the undersides of the tines of said forward row moving in a rearward direction and the undersides of the tines of said rear row moving in a forward direction and with the tines of said forward row successively contacting soil simultaneously with the tines of the rear row, handle means extending from said frame such that the movement of said machine may be guided by an operator walking with the machine, said tines of said rear row having a deeper soil penetrating capability than the tines of said forward row such that during normal operation of said machine the tines of said forward row break the surface of the earth and penetrate an untilled layer of soil to a controlled relatively shallow depth while the undersides thereof move in a rearward direction and direct the soil rearwardly and upwardly into the spacial separation between said rows of tines and toward the rotating tines of said rear row, resulting in forwardly directed reactionary thrust forces to be exerted on the machine, and said tines of said rear row penetrate a deeper untilled layer of soil to a further controlled depth while the undersides thereof move in a forward direction and direct soil upwardly and forwardly into said spacial separation between said rows of tines and toward the rotating tines of said rear row, resulting in rearwardly directed reactionary thrust forces to be exerted on said machine, said tines of said forward and rear rows having effective cutting diameters, rotative speeds, and depths of soil penetration such that said thrust forces resulting from tilling movement of the tines of said forward row are substantially equal to said thrust forces resulting from tilling movement of the tines of said rear row, whereby both said depths of penetrated soil are thoroughly pulverized and said reactionary rearward and forward thrust forces substantially offset each other to permit relatively easy manipulation of the machine during tilling.

2. The soil tilling machine of claim 1 in which the tines of said rear row have a larger effective cutting diameter than the tines of said forward row.

3. The soil tilling machine of claim 1 in which said drive means rotates the tines of said rear row at a greater peripheral speed than the tines of said forward row.

4. The soil tilling machine of claim 2 in which drive means rotates said forward and rear tines at substantially similar rotative speeds such that the tines of said rear row have a greater peripheral speed than the tines of said forward row.

5. The soil tilling machine of claim 1 including ground wheels mounted forwardly of said tines for supporting said frame for movement on the ground, and means selectively coupling said drive means to said ground wheels for moving said machine along a determined path.

6. The soil tilling machine of claim 1 in which said axes of rotation of said forward and rear rows of tines are in substantially the same horizontal plane during normal operation of said machine, and said tines of said rear row have a larger effective cutting diameter than the tines of said forward row.

7. The soil tilling machine of claim 1 in which said tines of said forward row penetrate the soil to a depth of between 0.2 and 0.8 of the depth of soil penetration of the tines in said rear row during normal operation of the machine.

8. The soil tilling machine of claim 7 in which said tines of said forward row penetrate the soil to a depth of about 0.5 of the depth of soil penetration of the tines of said rear row during normal operation of the machine.

9. The soil tilling machine of claim 7 in which the tines of said forward row have a cutting diameter of about 9" and the tines of said rear row have a cutting diameter of about 12".

10. The soil tilling machine of claim 9 in which the tines of said forward row extend a distance of about 1.5 inch below ground level and the tines of said rear row extend a distance of about 3.0 inches below ground level during normal operation of the machine.

11. The soil tilling machine of claim 1 including means for selectively adjusting elevation of the axes of rotation of the tines of said forward and rear rows with respect to said frame, and thus, the effective cutting depths of the tines of said forward and rear rows.

12. The soil tilling machine of claim 1 including means for simultaneously raising the elevation of the axis of rotation of the tines of said forward row and lowering the elevation of the axis of rotation of the tines of said rear row for selectively adjusting the respective cutting depths of the tines of said forward and rear rows.

13. The soil tilling machine of claim 12 including a forward tine axle upon which the tines of said forward row are mounted, a rear tine axle upon which the tines of said rear row are mounted, and said tine support means includes a pivot member rotatably carrying said tine axles and being supported by said frame for selective pivotal positioning of the tine axles relative to said frame.

14. The soil tilling machine of claim 13 in which said tine supporting means includes a tine transmission supported in depending fashion by said frame and rotatably carrying said tine axles, and means operatively connecting said tine transmission to said drive means.

15. The soil tilling machine of claim 14 including ground wheels mounted forwardly of said tines for supporting said frame for movement on the ground, a ground wheel transmission supported in depending fashion from said frame and rotatably carrying said ground wheels, and means operatively connecting said ground wheel transmission to said drive means.

16. The soil tilling machine of claim 15 in which said frame comprises two elongated transversally spaced supports, and said ground wheel transmission and tine transmission are mounted between said supports.

17. The soil tilling machine of claim 15 including clutch means for selectively disengaging said drive means from said tine transmission and ground wheel transmission, and second clutch means for selectively disengaging said drive means from said tine transmission while said drive means remains in operative driving engagement with said ground wheel transmission.

18. The soil tilling machine of claim 1 wherein the cutting periphery of the forward row of tines is separated from the cutting periphery of the rear row of tines a distance in the range of 0.02 to 0.50 of the distance between the centerline of the forward row of tines and the centerline of the rear row of tines.

19. The soil tilling machine of claim 18 wherein the cutting periphery of the forward row of tines is separated from the cutting periphery of the rear row of tines a distance of about 0.125 of the distance between the centerline of the forward row of tines and the centerline of the rear row of tines.

* * * * *